United States Patent
Wittenbecher et al.

(10) Patent No.: US 8,193,297 B2
(45) Date of Patent: Jun. 5, 2012

(54) CATALYST FOR CURING EPOXIDES

(75) Inventors: Lars Wittenbecher, Duesseldorf (DE); Matthias Maase, Mendham, NJ (US); Georg Degen, Lorsch (DE); Michael Henningsen, Frankenthal (DE); Manfred Doering, Woerth (DE); Ulrich Arnold, Bruchsal (DE)

(73) Assignee: BASF SE, Ludwigshafen (DE)

( * ) Notice: Subject to any disclaimer, the term of this patent is extended or adjusted under 35 U.S.C. 154(b) by 250 days.

(21) Appl. No.: 12/602,724

(22) PCT Filed: Jun. 6, 2008

(86) PCT No.: PCT/EP2008/057120
§ 371 (c)(1),
(2), (4) Date: Dec. 2, 2009

(87) PCT Pub. No.: WO2008/152005
PCT Pub. Date: Dec. 18, 2008

(65) Prior Publication Data
US 2010/0179299 A1     Jul. 15, 2010

(30) Foreign Application Priority Data
Jun. 12, 2007 (EP) .................... 07110080

(51) Int. Cl.
C08G 59/68 (2006.01)
C08L 63/02 (2006.01)
C08L 63/04 (2006.01)
B01J 31/18 (2006.01)

(52) U.S. Cl. ........ 528/117; 502/167; 525/507; 525/523; 525/533; 528/408

(58) Field of Classification Search .......... None
See application file for complete search history.

(56) References Cited

U.S. PATENT DOCUMENTS

| | | | |
|---|---|---|---|
| 3,635,894 A | 1/1972 | Dowbenko et al. | |
| 5,503,937 A | 4/1996 | Bertram et al. | |
| 8,053,546 B2 | 11/2011 | Degen et al. | |
| 2010/0137643 A1 | 6/2010 | Tishkov et al. | |
| 2010/0166971 A1 | 7/2010 | Wittenbecher et al. | |
| 2010/0184925 A1 | 7/2010 | Wittenbecher et al. | |

FOREIGN PATENT DOCUMENTS

| DE | 24 16 408 | 10/1975 |
|---|---|---|
| EP | 0 458 502 | 11/1991 |
| EP | 0 553 887 | 8/1993 |
| JP | 2004 217859 | 8/2004 |
| WO | WO 98/37134 A1 * | 8/1998 |

OTHER PUBLICATIONS

Kowalczyk et al., "Ionic liquids as conventional latent hardeners of epoxy resins," Polymery, vol. 48, Nos. 11-12, 2003, pp. 833-835.*
Sun et al., "Development of a high curing latency no-flow underfill with self-fluxing ability for lead-free solder interconnects," J. Adhesion Sci. Technol., vol. 18, No. 1, 2004, pp. 109-121.*
Sun et al., "Room Temperature Stable Underfill with Novel Latent Catalyst for Wafer Level Flip-Chip Packaging Applications," 2006 Electronic Components and Technology Conference, pp. 1905-1910.*

* cited by examiner

*Primary Examiner* — Robert Sellers
(74) *Attorney, Agent, or Firm* — Oblon, Spivak, McClelland, Maier & Neustadt, L.L.P.

(57) ABSTRACT

The use of 1,3-substituted imidazolium salts of the formula I

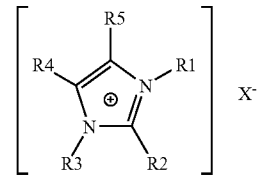

in which
R1 and R3 independently of one another are an organic radical having 1 to 20 C atoms,
R2, R4, and R5 independently of one another are an H atom or an organic radical having 1 to 20 C atoms, it also being possible for R4 and R5 together to form an aliphatic or aromatic ring, and
X is a thiocyanate anion
as latent catalysts for curing compositions comprising epoxy compounds.

17 Claims, No Drawings

CATALYST FOR CURING EPOXIDES

CROSS-REFERENCE TO RELATED APPLICATIONS

The present application is a National Stage application of PCT/EP08/057,120, filed on Jun. 6, 2008, which is based on and claims the benefits of priority to European Application No. 07110080.4, filed on Jun. 12, 2007.

BACKGROUND OF THE INVENTION

The invention relates to the use of 1,3-substituted imidazolium salts of the formula I

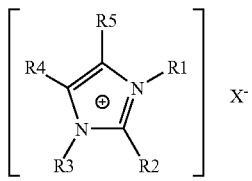

in which
R1 and R3 independently of one another are an organic radical having 1 to 20 C atoms,
R2, R4, and R5 independently of one another are an H atom or an organic radical having 1 to 20 C atoms, it also being possible for R4 and R5 together to form an aliphatic or aromatic ring, and
X is a thiocyanate anion
as latent catalysts for curing compositions comprising epoxy compounds.

Epoxy compounds are used for producing coatings, as adhesives, for producing shaped articles, and for numerous other purposes. In these applications they are generally present during processing in a liquid form (as solutions in suitable solvents or as liquid, solvent-free 100% systems). The epoxy compounds are generally of low molecular mass. In the context of the use they are cured. Various possibilities are known for curing. Starting from epoxy compounds having at least two epoxy groups it is possible, with an amino compound or with an acid anhydride compound having at least two amino groups or at least one anhydride group, respectively, for curing to take place through a polyaddition reaction (chain extension). Amino compounds or acid anhydride compounds of high reactivity are generally not added until shortly before the desired curing. The systems in question are therefore referred to as two-component (2K) systems.

Additionally it is possible to use catalysts for the homopolymerization or copolymerization of the epoxy compounds. Known catalysts include catalysts which are only active at high temperatures (latent catalysts). Latent catalysts of this kind have the advantage of allowing one-component (1K) systems; in other words, the epoxy compounds can comprise the latent catalysts without any unwanted premature curing occurring.

Latent catalysts available commercially include, in particular, adducts of boron trifluoride with amines ($BF_3$-monoethylamine), quaternary phosphonium compounds, and dicyandiamide (DICY).

Journal of Polymer Science: Polymer Letters Edition, vol. 21, 633-638 (1983) describes the use of 1,3-dialkylimidazolium salts for this purpose. Their decomposition above 175° C. releases 1-alkylimidazoles, which then bring about the cure. The structure of the cation has been varied, and the halides chloride and iodide have been used as anions.

DE-A 2416408 discloses imidazolium borates, such as imidazolium tetraphenylborate or imidazolium tetra-n-butylborate.

U.S. Pat. No. 3,635,894 describes 1,3-dialkylimidazolium salts with anions selected from chlorides, bromides, and iodides as latent catalysts for epoxy compounds.

Kowalczyk and Spychaj, Polimery (Warsaw, Poland) (2003), 48(11/12), 833-835 describe the use of 1-butyl-3-methylimidazolium tetrafluoroborate as a latent catalyst for epoxy compounds. The activity of the catalyst does not begin until 190° C.

Sun, Zhang and Wong, Journal of Adhesion Science and Technology (2004), 18(1), 109-121 disclose the use of 1-ethyl-3-methylimidazolium hexafluorophosphate as a latent catalyst. The activity begins only at 196° C.

JP 2004217859 uses imidazolium tetraalkylborates or imidazolium dialkyldithiocarbamates. The activation takes place by exposure to high-energy light.

EP 0 458 502 discloses a multiplicity of very different catalysts for epoxy compounds. Included in the list are 1-ethyl-2,3-dimethylimidazolium acetate (R1=ethyl, R2=methyl, and R3=methyl in formula I) and 1-ethyl-2,3-dimethylimidazolium acetate-acetic acid complex.

Suitable latent catalysts ought to be readily miscible with the epoxy compounds. The mixtures ought to remain stable for as long as possible at room temperature under standard storage conditions, so that they are suitable as storable 1K systems. In the context of the use, however, the temperatures required for curing should not be excessively high, and in particular should be well below around 200° C. Lower curing temperatures allow energy costs to be saved and unwanted secondary reactions avoided. In spite of the lower curing temperature, the mechanical and performance properties of the cured systems ought as far as possible not to be impaired. The desire is that these properties (examples being hardness, flexibility, bond strength, etc) should be at least as good and if possible even better.

An object of the present invention, therefore, were imidazolium salts as latent catalysts, and mixtures of these imidazolium salts and epoxy compounds meeting the requirements set out above.

BRIEF SUMMARY OF THE INVENTION

Found accordingly have been the above-defined use of the latent catalysts of the formula I, and compositions comprising the latent catalysts.

The Imidazolium Salts

The invention uses 1,3-substituted imidazolium salts of the formula I

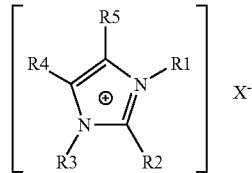

in which
R1 and R3 independently of one another are an organic radical having 1 to 20 C atoms,
R2, R4, and R5 independently of one another are an H atom or an organic radical having 1 to 20 C atoms, in particular 1 to 10 C atoms, it also being possible for R4 and R5 together to form an aliphatic or aromatic ring, and X is a thiocyanate anion.

R1 and R3 independently of one another are preferably an organic radical having 1 to 10 C atoms. The organic radical may also comprise further heteroatoms, more particularly oxygen atoms, preferably hydroxyl groups, ether groups, ester groups or carbonyl groups.

In particular R1 and R3 independently of one another are a hydrocarbon radical which apart from carbon and hydrogen may at most further comprise hydroxyl groups, ether groups, ester groups or carbonyl groups.

R1 and R3 are preferably independently of one another a hydrocarbon radical having 1 to 20 C atoms, more particularly having 1 to 10 C atoms, which comprises no other heteroatoms, oxygen or nitrogen for example. The hydrocarbon radical may be aliphatic (in which case unsaturated aliphatic groups are also included) or aromatic, or may comprise both aromatic and aliphatic groups.

Examples of hydrocarbon radicals that may be mentioned include phenyl group, benzyl group, a phenyl or benzyl group substituted by one or more C1 to C4 alkyl groups, or alkyl groups and alkenyl groups, more particularly the allyl group.

With particular preference R1 and R3 independently of one another are a C1 to C10 alkyl group, an allyl group or a benzyl group. A particularly preferred alkyl group is a C1 to C6 alkyl group, and in one particular embodiment the alkyl group is a C1 to C4 alkyl group.

With very particular preference R1 and R3 independently of one another are a methyl, ethyl, n-propyl, isopropyl, n-butyl, sec-butyl or tert-butyl group, an allyl group or a benzyl group, particular importance attaching to the methyl, ethyl, n-propyl, and n-butyl group.

In one particular embodiment

R1 and R3 are a methyl group,

R1 and R3 are an ethyl group,

R1 is a methyl group and R3 is an ethyl group,

R1 is a methyl group and R3 is an n-propyl group,

R1 is a methyl group and R3 is an n-butyl group,

R1 is a methyl group and R3 is an allyl group,

R1 is an ethyl group and R3 is an allyl group,

R1 is a methyl group and R3 is a benzyl group,

R1 is an ethyl group and R3 is a benzyl group.

R2, R4, and R5 independently of one another are an H atom or an organic radical having 1 to 20 C atoms, it also being possible for R4 and R5 together to form an aliphatic or aromatic ring. Besides carbon and hydrogen, the organic radical may also comprise heteroatoms such as nitrogen or oxygen; preferably it can comprise oxygen, more particularly in the form of hydroxyl groups, ester groups, ether groups or carbonyl groups.

More particularly, R2, R4, and R5 independently of one another are an H atom or a hydrocarbon radical which apart from carbon and hydrogen may at most further comprise hydroxyl groups, ether groups, ester groups or carbonyl groups.

R2, R4, and R5 are preferably independently of one another a hydrogen atom or a hydrocarbon radical having 1 to 20 C atoms, more particularly having 1 to 10 C atoms, which comprises no other heteroatoms, oxygen or nitrogen for example. The hydrocarbon radical may be aliphatic (in which case unsaturated aliphatic groups are also included) or aromatic, or may be composed of both aromatic and aliphatic groups, in which case R4 and R5 may also form an aromatic or aliphatic hydrocarbon ring, which if appropriate may be substituted by further aromatic or aliphatic hydrocarbon groups (the number of C atoms of the unsubstituted or substituted hydrocarbon ring, including the substituents, may in this case preferably be not more than 40, in particular not more than 20, with particular preference not more than 15, or not more than 10).

Examples of hydrocarbon radicals that may be mentioned include the phenyl group, a benzyl group, a phenyl or benzyl group substituted by one or more C1 to C4 alkyl groups, or alkyl groups, alkenyl groups, and, if R4 and R5 form a ring, an aromatic 5- or 6-membered ring formed by R4 and R5, or a cyclohexene or cyclopentene, it being possible for these ring systems in particular to be substituted by one or more C1 to C10, more particularly C1 to C4, alkyl groups.

With particular preference R2, R4, and R5 independently of one another are an H atom, a C1 to C8 alkyl group, a C1-C8 alkenyl group, such as an allyl group, or a phenyl group or a benzyl group.

With very particular preference R2, R4, and R5 independently of one another are an H atom or a methyl, ethyl, n-propyl, isopropyl, n-butyl, sec-butyl or tert-butyl group, particular importance attaching to the methyl, ethyl, n-propyl, and n-butyl group.

In one particular embodiment R2, independently of the other radicals R4 and R5 and the remaining radicals R1 and R3, is an H atom. Imidazolium salts of the formula I in which R2 is an H atom are particularly advantageous in the context of the present invention: they have good solubility in the epoxy compounds and a high activity as latent catalyst.

In one particular embodiment

R2, R4, and R5 are an H atom,

R2 is an H atom or a C1 to C4 alkyl group and R4 and R5 are each an H atom or a C1 to C4 alkyl group.

Specific cases of the cations of the compounds of the formula I that may be mentioned include the following:

1-butyl-3-methylimidazolium (R1=butyl, R3=methyl)

1-butyl-3-ethylimidazolium (R1=butyl, R3=ethyl)

1,3-dimethylimidazolium (R1=methyl, R3=methyl)

1-ethyl-3-methylimidazolium (R1=ethyl, R3=methyl)

1-ethyl-2,3-dimethylimidazolium (R1=ethyl, R2=methyl, R3=methyl)

X is a thiocyanate anion. Thiocyanate anions are also known under the name rhodanides. They can be present in the mesomeric forms $(S-C\equiv N)^-$ or $(S=C=N)^-$. The term thiocyanate is understood as meaning each of the mesomeric forms and also mixtures thereof.

DETAILED DESCRIPTION OF THE INVENTION

Imidazolium salts of the formula I are available commercially—for example, from the companies BASF, Sigma Aldrich or Merck. The anions of the salts available can easily be replaced by other anions by means of ion exchange, if desired.

The Epoxy Compounds

The curable composition comprises epoxy compounds. Particularly suitable epoxy compounds are those having 1 to 10 epoxy groups, preferably having at least 2 epoxy groups.

With particular preference the curable composition comprises epoxy compounds having 2 to 6, very preferably having 2 to 4, and in particular having 2 epoxy groups.

The epoxy groups are, in particular, glycidyl ether groups of the kind formed in the reaction of alcohol groups with epichlorohydrin.

The epoxy compounds may be low molecular mass compounds, which in general have an average molar weight Mn of less than 1000 g/mol, or compounds of higher molecular mass (polymers). They may be aliphatic compounds, including cycloaliphatic compounds, or compounds containing aromatic groups.

In particular the epoxy compounds are compounds having two aromatic or aliphatic 6-membered rings, or oligomers thereof.

Of significance in the art are epoxy compounds which are obtainable by reacting epichlorohydrin with compounds which have at least two reactive H atoms, more particularly with polyols.

Of particular significance in the art are epoxy compounds which are obtainable by reacting epichlorohydrin with compounds which comprise at least two, preferably two, hydroxyl groups and two aromatic or aliphatic 6-membered rings; such compounds include, in particular, bisphenol A and bisphenol F, and also hydrogenated bisphenol A and bisphenol F.

Also suitable are reaction products of epichlorohydrin with other phenols, such as with cresols or phenol-aldehyde adducts, such as phenol-formaldehyde resins, more particularly novolaks.

Also suitable, of course, are epoxy compounds which derive their epoxy compounds not from epichlorohydrin. Suitable examples include epoxy compounds which comprise epoxy groups through reaction with glycidyl (meth) acrylate, e.g., free-radical copolymerization with glycidyl (meth)acrylate. Mention may also be made in this context of ERL-4221 from Dow (CAS Number 2386-87-0):

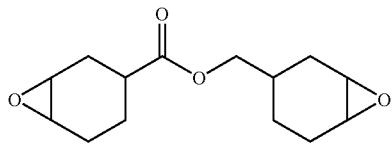

Epoxy compounds that are suitable for the use of the compositions are more particularly those which are liquid at processing temperatures of 20 to 100° C., more preferably at 20 to 40° C., very preferably at 20° C.

Other Ingredients of the Compositions

The composition of the invention may comprise other ingredients as well as the latent catalyst and the epoxy compound.

The composition is suitable for 1 K systems or else as a storable component for 2 K systems.

In the case of 2 K systems a second, highly reactive component is only added shortly before use; following the addition of the 2nd components, the resulting mixture is no longer storage-stable, because the crosslinking reaction or curing begins and leads to an increase in viscosity.

1 K systems already comprise all of the necessary ingredients, and are stable on storage.

The remarks below relating to the composition apply both to 1 K and 2 K systems, unless specifically stated otherwise.

As well as the epoxy compounds, the composition may comprise further reactive or nonreactive ingredients.

Suitable examples include phenolic resins; phenolic resins here are condensation products of phenol or derivatives of phenol, e.g., o-, m- or p-cresol, and aldehydes or ketones, more particularly formaldehyde. Particularly suitable phenolic resins are resoles and more particularly what are called novolaks, which are phenolic resins obtainable by acidic condensation of phenol or cresols with formaldehyde, more particularly with a molar excess of the phenol. The novolaks are preferably soluble in alcohols or acetone.

Also suitable are anhydride crosslinkers such as phthalic anhydride, trimellitic anhydride, benzophenonetetracarboxylic dianhydride, tetrahydrophthalic anhydride, hexahydrophthalic anhydride, 4-methyltetrahydrophthalic anhydride, 3-methyltetrahydrophthalic anhydride, 4-methylhexahydrophthalic anhydride or 3-methylhexahydrophthalic anhydride.

The phenolic resins and anhydride curing agents crosslink with epoxy compounds in the form of a polyaddition. This polyaddition reaction as well, more particularly the polyaddition reaction of the epoxy compounds with the phenolic resin, is accelerated by the imidazolium salt of the formula I.

Particularly suitable compositions of the invention hence also include those which as well as the imidazolium salt of the formula I and the epoxy compound also comprise at least one phenolic resin, preferably a novolak.

Nonreactive ingredients include resins which do not enter into any further crosslinking reaction, and also inorganic fillers or pigments.

The composition may also comprise solvents. Suitability is possessed by, if appropriate, organic solvents, in order to set desired viscosities.

In one preferred embodiment the composition comprises solvents, if at all, in minor amounts (less than 20 parts by weight, more particularly less than 10 or less than 5 parts by weight per 100 parts by weight of epoxy compound), and with particular preference does not comprise solvent (100% system).

Preferred compositions are composed of at least 30% by weight, preferably at least 50% by weight, very preferably at least 70% by weight, of epoxy compounds (in addition to any solvents used).

The amount of the imidazolium salt of formula I is preferably 0.01 to 10 parts by weight per 100 parts by weight of epoxy compound, more preferably at least 0.1, in particular at least 0.5, and very preferably at least 1 part by weight per 100 parts by weight of epoxy compound; the amount is preferably not higher than 8 parts, in particular not higher than 6 parts by weight per 100 parts by weight of epoxy compound, and in particular the amount may also, for example, be 1 to 6 or 3 to 5 parts by weight per 100 parts by weight of epoxy compound.

As well as the imidazolium salts of the formula I, the composition may of course also comprise further latent catalysts already known hitherto, examples being adducts of boron trifluoride with amines (BF3-monoethylamine), quaternary phosphonium compounds or dicyandiamide (DICY).

The composition is preferably liquid at processing temperatures of 20 to 100° C., more preferably at 20 to 40° C., very preferably at 20° C.

The increase in viscosity of the overall composition at temperatures up to 50° C. over a period of 10 hours, in particular of 100 hours (from the addition of the latent catalyst), is less than 20%, more preferably less than 10%, very preferably less than 5%, more particularly less than 2%, based on the viscosity of the composition without the latent catalyst at 21° C. and 1 bar.

The above composition is suitable as a 1 K system.

It is also suitable as a storable component of a 2 K system.

In the case of the 2 K systems only highly reactive components, such as conventional, highly reactive amine curing agents or reactive anhydride curing agents, are added prior to use; thereafter, curing begins and is evident from an increase in viscosity.

Suitable examples include reactive polyamines or polyanhydrides which are typically used as crosslinkers for epoxy compounds in 2 K systems. Known amine crosslinkers are, in particular, aliphatic polyamines such as diethylenetriamine, triethylenetetraamine or amines based on propylene oxide and ammonia (polyetheramines).

Curing and Use

The compositions which comprise imidazolium salts of the formula I are stable on storage. The imidazolium salts of the formula I are readily soluble in the epoxy compounds and in the compositions of the invention. The imidazolium salts of the formula I are active in the compositions as latent catalysts. Their efficiency in the polymerization or crosslinking of the epoxy compounds is very good.

At typical storage temperatures below 40° C., more particularly below 30° C., there is very little or no increase observed in the viscosity of the compositions. The compositions are therefore suitable as 1 K systems. 1 K systems, prior to their use, do not require the addition of a 2nd component to bring about curing or crosslinking.

The compositions are of course also suitable as a storable component for 2 K systems (see above).

The curing of the compositions, as a 1 K system or as a 2 K system, can take place at temperatures lower than has been possible with the latent imidazolium catalysts known to date. Curing can take place at atmospheric pressure and at temperatures less than 250° C., in particular at temperatures less than 200° C., preferably at temperatures less than 175° C., more preferably at temperatures less than 150° C., and very preferably at temperatures less than 125° C., and even less than 100° C. Curing at temperatures less than 80° C. is also possible. Curing may take place in particular in a temperature range from 40 to 175° C., more particularly from 60 to 150° C., or from 60 to 125° C.

The compositions of the invention are suitable for use as a coating or impregnating composition, as an adhesive, composite material, for producing shaped articles, or as casting compounds for embedding, attaching or solidifying shaped articles. This and the remarks below apply both to the 1 K systems and to 2 K systems; preferred systems for all of the stated applications are the 1 K systems.

Examples of coating compositions include paints and varnishes. Using the compositions of the invention (1 K or 2 K) it is possible in particular to obtain scratch-resistant protective coatings on any desired substrates, made from metal, plastic or wood-based materials, for example. The compositions are also suitable as insulating coatings in electronic applications, such as insulating coatings for wires and cables, for example. Mention may also be made of their use for producing photoresists. They are also suitable, in particular, as refinish coating material, including in connection, for example, with the renovation of pipes without their disassembly (curing in place pipe (CIPP) rehabilitation). They are additionally suitable for the sealing of floors.

Adhesives include 1 K or 2 K structural adhesives. Structural adhesives serve to connect shaped parts permanently to one another. The shaped parts may be of any desired material: suitable materials include plastic, metal, wood, leather, ceramic, etc. The adhesives in question may also be hot melt adhesives, which are fluid and can be processed only at a relatively high temperature. They may also be flooring adhesives. The compositions are also suitable as adhesives for producing printed circuit boards (electronic circuits), not least by the SMT method (surface-mounted technology).

In composites, different materials, such as plastics and reinforcing materials (fibers, carbon fibers), are joined to one another.

The compositions are suitable, for example, for producing preimpregnated fibers, e.g., prepregs, and for their further processing to composites.

Production methods for composites include the curing of preimpregnated fibers or woven fiber fabrics (e.g., prepregs) after storage, or else extrusion, pultrusion, winding, and resin transfer molding (RTM) called resin infusion technologies (RI).

The fibers can be impregnated with the composition of the invention, in particular, and thereafter cured at a higher temperature. In the course of impregnation and any subsequent storage period, curing does not begin or is only minimal.

As casting compounds for embedding, attaching or solidifying shaped articles, the compositions are employed, for example, in electronics applications. They are suitable as flip-chip underfill or as electrical casting resins for potting, casting and (glob-top) encapsulation.

EXAMPLES

Starting Materials

The epoxy compound used was the diglycidyl ether of bisphenol A (DGEBA for short), available as a commercial product from Nan Ya under the name NPEL 127H.

Compositions Investigated

In each case 5 parts by weight of the imidazolium salt or of a mixture of imidazolium salts were mixed with 100 parts by weight of the epoxy compound. Table 1 lists the compositions and results. In the cases of $1^x$ and $1^{xx}$, mixtures with further ingredients as well were tested (see footnote below Table 2).

Measurement Methods

The onset and the process of curing were investigated by means of Differential Scanning Calorimetry (DSC). For this purpose, 5 to 15 milligrams of the composition were heated in a DSC calorimeter (DSC 822, Mettler Toledo) with a constant rate of 10° C./min.

The parameters determined were To (beginning of exothermic polymerization reaction, onset temperature, Tmax (temperature maximum of the exothermic peak, corresponding to the maximum acceleration of reaction), and ΔH (integral of the DSC curve, corresponding to the total amount of liberated heat from the polymerization reaction).

Measured in addition were the glass transition temperature (Tg) of the cured, fully reacted sample, by means of DSC as follows:

20 g of the uncured composition were introduced with a film thickness of 3 to 4 mm into an aluminum boat and cured for 30 minutes each at 40° C., 60° C., 80° C., 100° C., 120° C., and 140° C. The Tg of the cured sample was determined by DSC measurement with a heating rate of 30° C./min, as the average value from three independent measurements.

The storage stability (pot life) was examined by measuring the relative viscosity (GELNORM®-RVN viscometer). At different temperatures (25° C., 80° C., 100° C., and 120° C.) a measurement was made of the time, in days (d) or minutes (min). The time reported is the time after which the mixture is still pourable.

TABLE 1

| Imidazolium salts | | |
| --- | --- | --- |
| Salt | Imidazolium cation | Anion |
| 1 | 1-Ethyl-3-methylimidazolium | Thiocyanate |
| 3 | 1,3-Dimethylimidazolium | Acetate |
| C1 | 1-Butyl-3-methylimidazolium | Chloride |
| C2 | 1-Ethyl-3-methylimidazolium | Methanesulfonate |

TABLE 2

| | | | | | Storage stability 25° C. (d) | Storage stability 80° C. (min) |
|---|---|---|---|---|---|---|
| Salt | To (° C.) | Tmax (° C.) | ΔH (J/g) | Tg (° C.) | | |
| 1 | 93 | 123 | 533 | 127 | 2 | 17 |
| C1 | 192 | 245 | 518 | 104 | >20 | >300 |
| C2 | 280 | 315 | 418 | n.d. | n.d. | >300 |

The invention claimed is:

1. A method of curing a composition, the method comprising curing a composition comprising at least one epoxy compound in the presence of a latent catalyst comprising a 1,3-substituted imidazolium salt of formula I

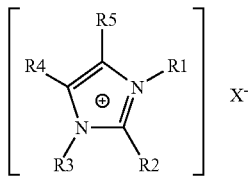

wherein
R1 and R3 are each, independently of one another, an organic radical having 1 to 20 C atoms,
R2, R4, and R5 are each, independently of one another, an H atom or an organic radical having 1 to 20 C atoms, it also being possible for R4 and R5 together to form an aliphatic or aromatic ring, and
X is thiocyanate anion.

2. The method according to claim 1, wherein R1 and R3 are each, independently of one another, a C1 to C10 alkyl group, an allyl group or a benzyl group.

3. The method according to claim 1, wherein R2, R4, and R5 are each, independently of one another, an H atom or a C1 to C8 alkyl group, a C1 to C8 alkenyl group.

4. The method according to claim 1, wherein R2 is an H atom.

5. The method according to claim 1, wherein the composition comprises an epoxy compound having at least 2 epoxy groups.

6. The method according to claim 1, wherein the composition comprises an epoxy compound having on average 2 epoxy groups.

7. The method according to claim 1, wherein the composition comprises an epoxy compound obtained by reacting epichlorohydrin with at least one alcohol.

8. The method according to claim 1, wherein the composition comprises at least 30% by weight of the at least one epoxy compound, and further comprises water and an organic solvent.

9. The method according to claim 1, wherein an amount of the latent catalyst is 0.01 to 10 parts by weight per 100 parts by weight of the at least one epoxy compound.

10. A curable composition comprising an epoxy compound and a latent catalyst of formula I:

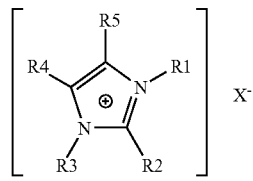

wherein
R1 and R3 are each, independently of one another, an organic radical having 1 to 20 C atoms,
R2, R4, and R5 are each, independently of one another, an H atom or an organic radical having 1 to 20 C atoms, it also being possible for R4 and R5 together to form an aliphatic or aromatic ring, and
X is thiocyanate anion.

11. The curable composition according to claim 10, comprising at least 30% by weight of the epoxy compound, and further comprising water and an organic solvent.

12. A method of curing the composition according to claim 10, wherein the curing takes place at temperatures less than 200° C.

13. The method according to claim 1, wherein the composition further comprises an anhydride curing agent, or a phenolic resin.

14. The method according to claim 1, wherein the latent catalyst comprises at least one selected from the group consisting of 1-butyl-3-methylimidazolium, 1-butyl-3-ethylimidazolium, 1,3-dimethylimidazolium, 1-ethyl, 3-methylimadazolium, and 1-ethyl-2,3-dimethylimidazolium.

15. The method according to claim 1, wherein the curing comprises a polyaddition reaction.

16. The method of claim 1, wherein the composition further comprises a novolak.

17. The method of claim 1, wherein R2, R4, and R5 are each, independently of one another, an allyl group, a phenyl group, or a benzyl group.

* * * * *